United States Patent [19]
Crook et al.

[11] Patent Number: 5,628,234
[45] Date of Patent: May 13, 1997

[54] FAIL-FREE ACTUATOR ASSEMBLY

[75] Inventors: David J. C. Crook, Randolph, N.J.; Eugene E. Shube, Elmont, N.Y.

[73] Assignee: GEC-Marconi Aerospace Inc., Parsippany, N.J.

[21] Appl. No.: 544,968

[22] Filed: Oct. 30, 1995

[51] Int. Cl.$^6$ ................................ F16M 37/08
[52] U.S. Cl. ............... 74/665 B; 74/661; 475/1; 475/221; 475/293
[58] Field of Search ............... 74/665 A, 665 B, 74/665 E, 661; 475/1, 5, 221, 293, 295, 329, 330, 263; 477/3, 5

[56] References Cited

U.S. PATENT DOCUMENTS

| | | | |
|---|---|---|---|
| 2,700,310 | 1/1955 | Viebrock et al. | 74/650 |
| 3,830,349 | 8/1974 | Williams | 74/661 |
| 3,971,266 | 7/1976 | Inakura et al. | 475/1 |
| 4,858,491 | 8/1989 | Shube | 74/665 B |

*Primary Examiner*—Charles A. Marmor
*Assistant Examiner*—Sherry Lynn Estremsky
*Attorney, Agent, or Firm*—Fish & Neave; Robert R. Jackson

[57] ABSTRACT

An electro-mechanical actuator has two motors which normally operate at the same speed and combine (sum) to move a load via a rotary actuator output member. If the motors begin to operate at different speeds, this indicates that the system has failed, and the output member is automatically decoupled from the remainder of the actuator. This leaves the output member free to rotate relative to the remainder of the actuator. The speeds of the motors are monitored by a differential mechanism which produces a rotary output proportional to the average of the two motor speeds. This average is normally the same as the speed of the output member. Decoupling of the output member occurs when this average deviates from the output member speed.

10 Claims, 2 Drawing Sheets

FAIL-FREE ACTUATOR ASSEMBLY

BACKGROUND OF THE INVENTION

This invention relates to electro-mechanical actuators, and more particularly to electro-mechanical actuators which release their loads in the event of actuator failure.

Shube U.S. Pat. No. 4,858,491 (which is hereby incorporated by reference herein) shows so-called fail-free electro-mechanical actuators and discusses the operating principles of such actuators. Basically, the actuators shown in the '491 patent have two drive motors that normally operate at the same speed. If either motor ceases to keep up with the other motor, the actuator is automatically decoupled from its load. Most of the embodiments shown in the '491 patent are linear actuators, although the embodiment shown in FIG. 11 is a rotary actuator.

There is increasing interest in the rotary form of fail-free actuators because they offer the potential for being smaller, for having fewer components, and for therefore being cheaper and more reliable than the linear form of fail-free actuators. For example, in the linear actuator shown in FIG. 1 of the '491 patent the threaded shaft and threaded follower required to convert the rotary motion of the drive motors to linear actuator output motion can be eliminated in a rotary actuator. It would therefore be desirable to further optimize fail-free actuator mechanisms for rotary output.

In the embodiments shown in the '491 patent the motors rotate in opposite directions and a reversing mechanisms 52c reverses one of these rotations downstream from monitor differential 16 but upstream from the gear 56 which sums the two motor outputs to drive the actuator output. In the interest of further optimizing the fail-free actuator mechanism it would be desirable to eliminate this reversing mechanism.

In view of the foregoing, it is an object of this invention to improve and simplify fail-free electro-mechanical actuators.

It is a more particular object of this invention to improve and simplify rotary output, fail-free, electro-mechanical actuators.

SUMMARY OF THE INVENTION

These and other objects of the invention are accomplished in accordance with the principles of the invention by providing an electro-mechanical actuator having two drive motors, both of which normally rotate in the same direction at the same speed. Rotation of both motors is monitored by an averaging differential mechanism, which has a rotary output whose speed is proportional to the average of the speeds of the two drive motors. The two motors are also connected in parallel to drive a rotary output of the actuator. A releasable detent-type clutch is connected in series between at least one of the motors and the rotary actuator output. The speed of the rotary differential mechanism output is normally the same as the speed of the rotary actuator output. A releasable connection is provided in a downstream portion of the rotary actuator output. This releasable connection is controlled by the rotary differential mechanism output. As long as the actuator is operating normally and the differential mechanism output is rotating at the same speed as the rotary actuator output, the releasable connection prevents the releasable connection from releasing. But if the actuator malfunctions (e.g., if one of the drive motors slows down or stops), the speed of the rotary differential mechanism output becomes different from the rotary actuator output, thereby causing the releasable connection to release. This disconnects the actuator from its load, giving the actuator its fail-free operating characteristic. Depending on the mode of failure of the actuator, the clutch mentioned above may also release during failure. If desired, two clutches with different release torques may be respectively connected in series with the two drive motors. No reversing mechanism is required because both the differential mechanism and the rotary actuator output operate by additively combining the motor outputs. No subtraction of the motor outputs is needed.

Further features of the invention, its nature and various advantages will be more apparent from the accompanying drawings and the following detailed description of the preferred embodiments.

DETAILED DESCRIPTION OF THE PREFERRED EMBODIMENTS

Figure 1:
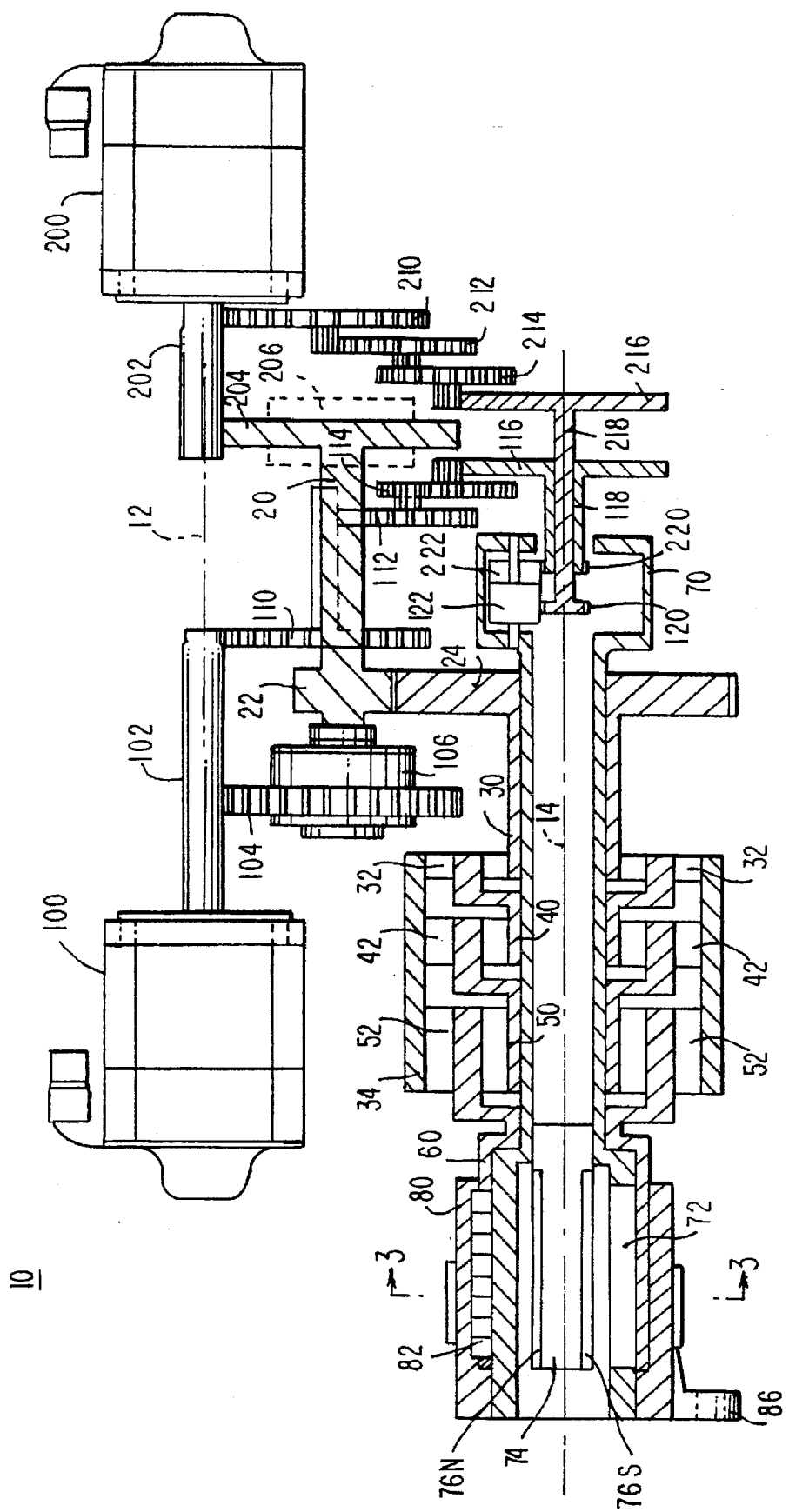
FIG. 1 is a simplified, somewhat schematic view of an illustrative embodiment of the invention.
Figure 2:
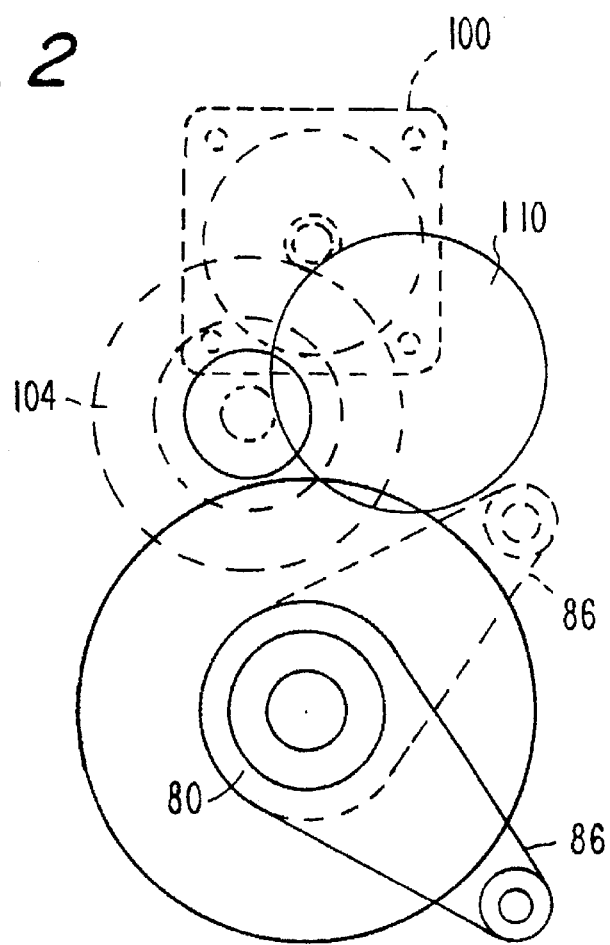
FIG. 2 is a simplified, somewhat schematic view of the apparatus of FIG. 1 as viewed from the left in FIG. 1.

As shown in FIG. 1, an illustrative embodiment 10 of a fail-free rotary actuator constructed in accordance with the principles of this invention has two drive motors 100 and 200. Although this is not essential, it may be preferred for compactness of the actuator design to have motors 100 and 200 disposed on a common axis 12 as is shown in FIG. 1. The shafts 102 and 202 preferably rotate in the same direction at any given time. (By "rotation in the same direction" it is meant that if an observer looks along axis 12 in a given direction, both of shafts 102 and 202 will be seen to be rotating either clockwise or counter-clockwise about that axis.) Of course, the actuator may be reversible, in which case both shafts preferably rotate together in the same "forward" or "reverse" direction, depending on whether the actuator is operating in the respective "forward" or "reverse" direction.

Shaft 102 drives a power train that includes gear 104 and releasable detent clutch 106, the output of which is shaft 20. Shaft 202 also drives shaft 20 through gear 204. Thus motors 100 and 200 are connected in parallel to drive shaft 20. Clutch 106 releases if the torque differential across it becomes too great (i.e., greater than a predetermined threshold value). After clutch 106 has released, relative rotation between shafts 20 and 102 is no longer constrained by the gear ratio between shaft 102 and gear 104. Any of several modes of failure may cause clutch 106 to release. For example, the load the actuator is attempting to move may be too great, or one of motors 100 and 200 may become "frozen" and cease to rotate, while the other motor continues to rotate. In any of these situations clutch 106 will release, allowing relative rotation of shafts 20 and 102 unconstrained by the gear ratio between shaft 102 and gear 104.

The drive power from shaft 20 passes through a further power drive train which includes gears 22 and 24 and a succession of sun and planet gear arrangements concentric with axis 14. For example, the first of these arrangements includes sun gear 30 formed on the rotating hub that is driven by gear 24. Sun gear 30 drives a plurality of planet gears 32, each of which is rotatably mounted on an extension of the next sun gear 40. Stationary, internally toothed ring 34 meshes with all of planet gears 32, 42, and 52. Accordingly, as sun gear 30 rotates about axis 14, planet gears 32 are forced to move around axis 14. This causes sun gear 40 to rotate about axis 14. Sun gear 40 cooperates with planet gears 42 in the same way that sun and planet gears 30 and 32 cooperate with one another. Accordingly, rotation of sun gear 40 causes planet gears 42 to rotate the next sun gear 50. Sun gear 50 in turn cooperates with planet gears 52 in the same way to cause sleeve 60 to rotate concentrically about axis 14.

In order to monitor actuator 10 for possible failure, shaft 102 drives a monitor gear train which includes successive gears 110, 112, 114, and 116. Shaft 202 similarly drives a monitor gear train which includes successive gears 210, 212, 214, and 216. The output shafts 118 and 218 of gears 116 and 216 are concentric with one another and with axis 14. Each of shafts 118 and 218 ends in a respective gear 120 and 220 which engages a respective gear 122 and 222 inside monitor differential housing 70. Each of gears 122 and 222 is rotatably mounted on a respective shaft inside housing 70, and gears 122 and 222 mesh with one another at locations along their lengths where they do not mesh with gears 120 and 220. The monitor gearing from shafts 102 and 202 to gears 120 and 220 is such that when motors 102 and 202 are rotating in the same direction at the same speed, gears 120 and 220 also rotate in the same direction at the same speed. This causes gears 122 and 222 to revolve around axis 14 without rotating on their shafts and without rotating relative to one another. Such revolution of gears 122 and 222 about axis 14 causes housing 70 to rotate about that axis. In particular, housing 70 rotates about axis 14 at the same speed that shafts 118 and 218 rotate. The power gear trains and the monitor gear trains are also designed so that, when the actuator is thus operating normally, housing 70 rotates at the same speed as sleeve 60.

Figure 3:
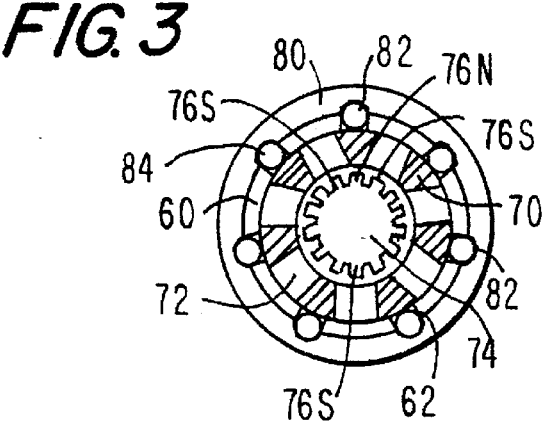
FIG. 3 is a simplified sectional view taken along the line 3—3 in FIG. 1.

As can be seen most clearly in FIG. 3, sleeve 60 is releasably coupled to concentric output sleeve 80 by a plurality of cylindrical rollers 82. Each of rollers 82 is normally disposed in a respective axial slot 62 in sleeve 60 so that a portion of the cylindrical side of each roller extends radially outward into an axial groove 84 in the inner surface of sleeve 80. Each of rollers 82 is normally prevented from moving radially inwardly by an extension of housing 70 which rotatably passes through hubs 30, 40, and 50 concentric with axis 14. The normal angular position of housing 70 relative to sleeves 60 and 80 is shown in FIG. 3. This normal position is maintained as long as the actuator is functioning properly because, as has been mentioned, sleeve 60 and housing 70 normally rotate at the same speed. With components 60, 70, 80, and 82 in the relative positions shown in FIG. 3, rotary motion of sleeve 60 is transmitted to actuator output sleeve 80 by rollers 82. If a purely rotary output is required from the actuator, sleeve 80 may provide that output. Alternatively, the rotary output of sleeve 80 may be converted to a linear motion by connecting a suitable linkage to crank arm 86, which is fixedly attached to sleeve 80.

If actuator 10 malfunctions (e.g., in any of the failure modes mentioned above), shafts 102 and 202 no longer rotate at the same speed. This causes different rotational speeds of gears 120 and 220, which in turn causes relative rotation of gears 122 and 222. Relative rotation of gears 122 and 222 allows the rotation of housing 70 to slow down relative to the faster of gears 120 and 220. In particular, housing rotates at a speed which is the average of the speed of gears 120 and 220. Thus elements 120, 220, 122, 222, and 70 constitute a monitor differential which effectively sums its two inputs (the rotational speeds of gears 120 and 220), divides that sum in half, and outputs the resulting quotient as the rotational speed of housing 70. In contrast to this operation of the monitor components, the power drive train includes no comparable differential. During failure of the actuator, sleeve 60 therefore tends to either stop rotating or to continue to rotate at a speed dictated by one (not both) of drive motors 100 or 200. The rotational speed of sleeve 60 therefore begins to differ from the rotational speed of housing 70. This quickly allows longitudinal channels 72 in housing 70 to become aligned with slots 62 in sleeve 60. When this happens, rollers 82 can move radially inwardly into channels 72, thereby freeing output sleeve 80 from its rotational coupling to sleeve 60. This allows sleeve 80 to rotate freely and places the actuator in its fail-free mode. The load normally moved at least in part by actuator 10 is thereby freed from the failed actuator (e.g., so that it can continue to be moved by other actuators that have not failed). Once rollers 82 have moved into channels 72, they are preferably retained there by any suitable means such as the depicted magnet 74, which has axially extending, alternating, north and south poles 76N and 76S spaced from one another circumferentially around the magnet. This prevents the actuator from engaging again after it has disengaged and freed its load. In lieu of magnet 74, rollers 82 could alternatively be captured by any of many other types of structures such as spring clips or other detent elements.

From the foregoing it will be seen that the fail-free actuator structure of this invention allows both drive motors to rotate in the same direction, thereby eliminating the need to reverse the power output from one of those motors before summing the motor outputs to produce the actuator output. Instead of using a monitor differential whose internal parts rotate in order to keep the differential output stationary except when the actuator has failed (as in the '491 patent), the present apparatus preferably employs a monitor differential whose internal parts (gears 122 and 222) are stationary relative to one another except when the actuator has failed. Because these stationary parts are not very often required to rotate relative to one another, they can be cheapened considerably. The apparatus of this invention provides a compact and efficient rotary fail-free actuator. For example, this apparatus lends itself to locating both drive motors 100 and 200 along a common axis 12 as shown in FIG. 1. The reversing mechanism 52c employed in the '491 patent is eliminated. And crank arm 86 provides a low-cost and efficient way to convert the rotary output of the actuator to linear motion if the ultimately desired output motion is linear.

It will be understood that the foregoing is only illustrative of the principles of this invention, and that various modifications can be made by those skilled in the art without departing from the scope and spirit of the invention. For example, drive motors 100 and 200 do not have to be disposed on the same axis 12. The axes of the drive motors do not even have to be parallel to one another or parallel to the axis 14 of the output components. The particular power and monitor gearing shown in the drawings is only illustrative, and many other arrangements are possible. It is not necessary to use only gears to transmit power and monitoring information. For example, pulleys and belts or chains and sprockets can be used if desired. Although only motor 100 is described above as having an associated releasable detent clutch 106, it will be understood that motor 200 could also have such a clutch if desired. Indeed, FIG. 1 shows by dotted lines 206 that a releasable detent clutch 206 can be included between gear 204 and shaft 20. If two such clutches 106 and 206 are provided, they are preferably designed to release at different torque threshold values. As still another example of possible modifications within the scope of this invention, many types of releasable couplings other than rollers 82 can be used between sleeves 60 and 80. For example, balls can be used instead of rollers, or radially extending pins with rounded ends can be used. Many of the releasable coupling principles (including various techniques for retaining coupling components once they have released) shown and described in the '491 patent are again applicable to the present apparatus.

The invention claimed is:

1. An actuator assembly for selectively moving a load comprising:

first and second drive motors for normally respectively producing first and second rotary outputs;

first and second transmissions for normally respectively applying said first and second rotary outputs in parallel to a first rotary member in order to normally rotate said first rotary member at a speed proportional to a normally common speed of said first and second rotary outputs;

third and fourth transmissions for respectively applying said first and second rotary outputs in parallel to a differential mechanism which rotates a second rotary member at a speed proportional to an average of the speeds of said first and second rotary outputs, said speed of said second rotary member being normally the same as the speed of said first rotary member;

a rotary actuator output member operatively coupled to said load; and a coupling mechanism responsive to the speeds of said first and second rotary members for transmitting rotary motion of said first rotary member to said rotary actuator output member as long as the speeds of said first and second rotary members are substantially the same, and for freeing said rotary actuator output member for rotation relative to said first rotary member when the speeds of said first and second rotary members begin to deviate from one another.

2. The apparatus defined in claim 1 wherein said first transmission includes a first releasable detent-type clutch connected in series between said first rotary output and said first rotary member for effectively disconnecting said first rotary output from said first rotary member in the event that a torque difference across said first clutch exceeds a first predetermined threshold value.

3. The apparatus defined in claim 2 wherein said second transmission includes a second releasable detent-type clutch connected in series between said second rotary output and said first rotary member for effectively disconnecting said second rotary output from said first rotary member in the event that a torque difference across said second clutch exceeds a second predetermined threshold value.

4. The apparatus defined in claim 3 wherein said first threshold value is different from said second threshold value.

5. The apparatus defined in claim 1 wherein said first and second motors normally rotate in a same direction at any given time.

6. The apparatus defined in claim 1 wherein said first and second motors are disposed so that said first and second rotary outputs are coaxial.

7. The apparatus defined in claim 1 wherein said first rotary member is disposed concentrically between said second rotary member and said output member, and wherein said coupling mechanism comprises:

a coupling member disposed in an aperture in said first rotary member so that a portion of said coupling member normally extends radially from said aperture into a recess in said output member to transmit rotary motion of said first member to said output member, said coupling member being normally held in the position in which it thus extends into said recess by said second rotary member until said second rotary member has rotated relative to said first rotary member, which aligns a recess in said second rotary member with said coupling member, thereby allowing said coupling member to withdraw from said recess in said output member.

8. The apparatus defined in claim 7 further comprising:

a structure for holding said coupling member withdrawn from said recess in said output member after said coupling member has been allowed to withdraw from said recess.

9. The apparatus defined in claim 8 wherein said structure comprises a magnet.

10. The apparatus defined in claim 1 wherein third and fourth transmissions respectively apply said first and second rotary outputs to said differential mechanism via similar first and second gears, which are coaxial but axially spaced from one another, and which normally rotate in the same direction at a common speed at any given time, and wherein said differential mechanism comprises:

third and fourth gears rotatably mounted on said second rotary member and respectively meshing with said first and second gears, said third and fourth gears also meshing with one another, and said second rotary member being rotatable coaxially with said first and second gears.

* * * * *